United States Patent [19]

Hanlon

[11] Patent Number: 4,469,017
[45] Date of Patent: Sep. 4, 1984

[54] STATIC LEAK SEAL ASSEMBLY FOR USE IN FLUID CONTAINING MACHINERY

[75] Inventor: Paul C. Hanlon, Louisville, Ky.

[73] Assignee: Dover Corporation, Louisville, Ky.

[21] Appl. No.: 468,981

[22] Filed: Feb. 23, 1983

[51] Int. Cl.³ .............................................. F16J 15/18
[52] U.S. Cl. ...................................... 92/168; 277/27;
277/152; 277/191; 91/461
[58] Field of Search ................ 277/190, 191, 27, 152, 277/153; 92/168

[56] References Cited

U.S. PATENT DOCUMENTS

| | | | |
|---|---|---|---|
| 480,943 | 8/1892 | Bodfish | 277/190 |
| 4,230,324 | 10/1980 | Derman | 277/27 |
| 4,411,434 | 10/1983 | Lewis | 277/27 |

FOREIGN PATENT DOCUMENTS 1528384 4/1970 Fed. Rep. of Germany ...... 277/190

*Primary Examiner*—Paul E. Maslousky
*Attorney, Agent, or Firm*—Maurice L. Miller, Jr.

[57] ABSTRACT

A static leak seal assembly for use in a conventional compressor for preventing high pressure gas leakage from occurring through the spaces between a movable piston rod and a frame of the machine when the rod is motionless is disclosed. A piston is mounted on the rod for axial movement between retracted and extended positions. A follower ring is disposed around the rod and is likewise movable in an axial direction along the rod between retracted and extended positions in response to corresponding movement of the piston. When moved to its extended position by the piston, the follower ring engages a compressible, resilient collar to compress a neck of the collar inwardly against the rod to effect a substantially fluid tight seal therearound. The ring is separate and distinct from the piston to permit the former to adjust in radial disposition about the rod to uniformly compress the collar neck against the rod around the entire periphery of the latter. Springs located in recesses formed around a sealing ring containment plate bias the piston to its retracted position to relieve the pressure of the ring from the collar neck when the rod is in motion. A fluid circuit drives the piston from a retracted to an extended position in opposition to the springs when the compressor is shut down and the rod becomes motionless.

12 Claims, 6 Drawing Figures

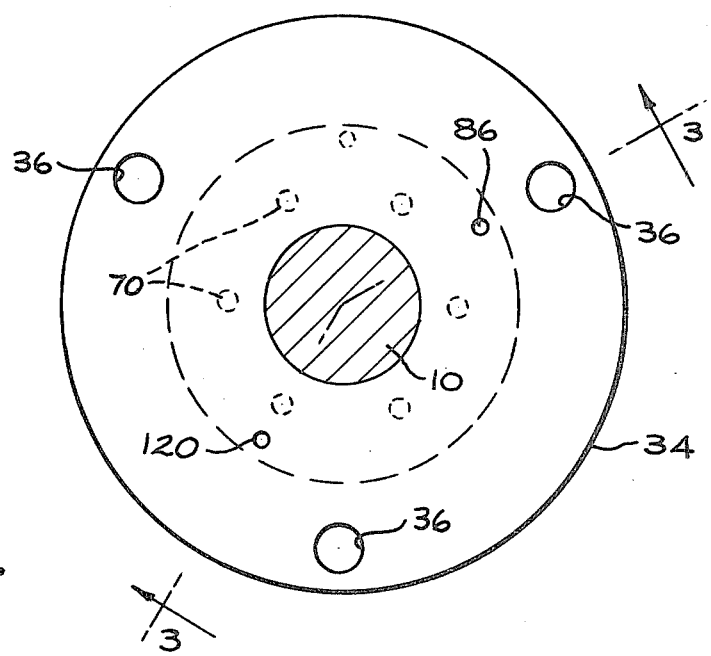
FIG. 2
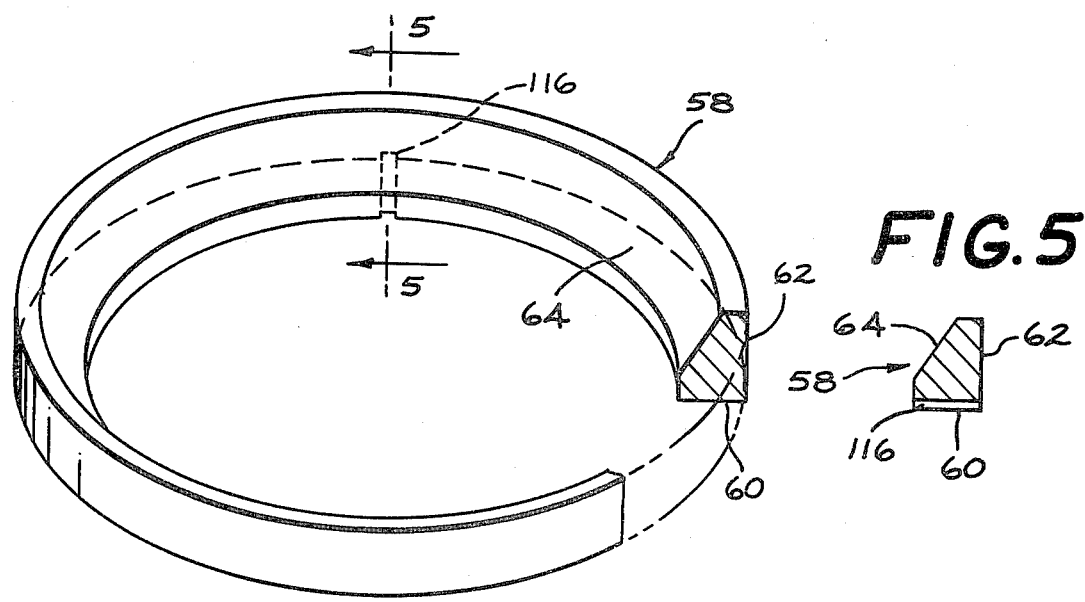
FIG. 4
FIG. 5

STATIC LEAK SEAL ASSEMBLY FOR USE IN FLUID CONTAINING MACHINERY

BACKGROUND OF THE INVENTION

This invention relates to an assembly for use in a machine such as a motor or compressor for preventing fluid leakage from occurring in the spaces between a movable rod and frame of the machine when the machine is in an inactive or static condition such that the rod is motionless.

Packing ring assemblies for preventing fluid leakage between the movable rod and frame of a machine have, generally speaking, long been in use in the prior art. Such prior art assemblies are shown and described in detail in Bulletin No. TBP-76 published by Dover Corporation/C. Lee Cook Division, P.O. Box 1038, Louisville, Ky. 40201. While such ring assemblies are highly effective in preventing such leaks in machines such as compressors, for example, when the compressor piston rod is in motion, they are less effective when the rod is at rest as when the compressor is inactive. Some industrial compressors, such as those used in pumping stations along natural gas transmission lines, remain in a static or inactive condition for much longer time periods than they are actually in use in the compression of gas. As a result, significant volumes of gas can be lost to atmosphere through the rod packing of these machines during their long periods of inactivity. The problem has become more significant in recent years due to the substantial increases in the cost and value of natural gas that have occurred.

There are several possible reasons why these prior art packing rings tend to leak at substantially greater rates when the machines in which they are used are inactive than when operating. First, the presence of lubricating oil under pressure in the spaces between the moving piston and the packing rings is believed to impede gas leakage. Thus when the machine is shut down with a consequent loss of pressurized lubricating oil, gas leakage can increase. Changes in piston rod alignment and in the shape of the sealing rings following shutdown of the machine as a result of temperature changes may also contribute to increased gas leakage.

By means of my invention, these and other problems encountered in the use of prior art packing rings are substantially overcome.

SUMMARY OF THE INVENTION

It is an object of the present invention to provide a static leak seal assembly for use in a machine such as a motor or compressor which substantially prevents fluid leakage from occurring along a movable rod of the machine when the rod is motionless.

Briefly in accordance with my invention, I provide a static leak seal assembly for a machine of the type which conventionally includes a cylinder, a fluid under pressure in said cylinder, a rod movable in the fluid, packing means for maintaining a fluid tight seal about said rod when said rod is in motion, and a packing flange. The assembly includes piston means separate and distinct from said flange adapted for movement relative to the rod from a retracted to an extended position when the movement of said rod has been stopped and from said extended to said retracted position preparatory to setting said rod in motion. A follower means is also provided which is separate and distinct from the piston means and which is adapted for slidable movement in an axial direction relative to the rod between retracted and extended positions in response to corresponding movements of the piston means, the follower means being at least slightly movable in all radial directions about the rod. Also included is a fluid sealing means constructed of a flexible, resilient material which is adapted for mounting around the rod next to the follower means. The sealing means is compressible inwardly against the rod to form a substantially fluid tight seal therearound. The follower means is adapted to compress the sealing means to form the seal when placed in its extended position. Biasing means is provided for maintaining the piston means in a retracted position when the rod is in motion. Means for driving the piston means to its extended position in opposition to the biasing means when the rod becomes motionless is provided. Lastly, means is provided for deactivating the driving means to permit the biasing means to return the piston means to its retracted position to break the seal preparatory to setting the rod in motion.

These and other objects, features and advantages of the packing ring assembly of the subject invention will become apparent to those skilled in the art from the following detailed description and attached drawings upon which, by way of example, only a preferred embodiment of the subject invention is illustrated.

BRIEF DESCRIPTION OF THE DRAWINGS

FIG. 2 shows a cross-sectional end elevation view of the compressor piston rod and assembly of FIG. 1 as viewed along lines 2—2 of the latter figure.

FIG. 4 shows an oblique projection of the following ring portion of the assembly of FIGS. 1-3 with a portion of the ring broken away to illustrate its cross-sectional geometry.

FIG. 5 shows a cross-sectional view of the ring of FIG. 4 taken through a vent channel as viewed along cross-section lines 5—5 of the latter figure.

DESCRIPTION OF THE PREFERRED EMBODIMENT

Figure 1:
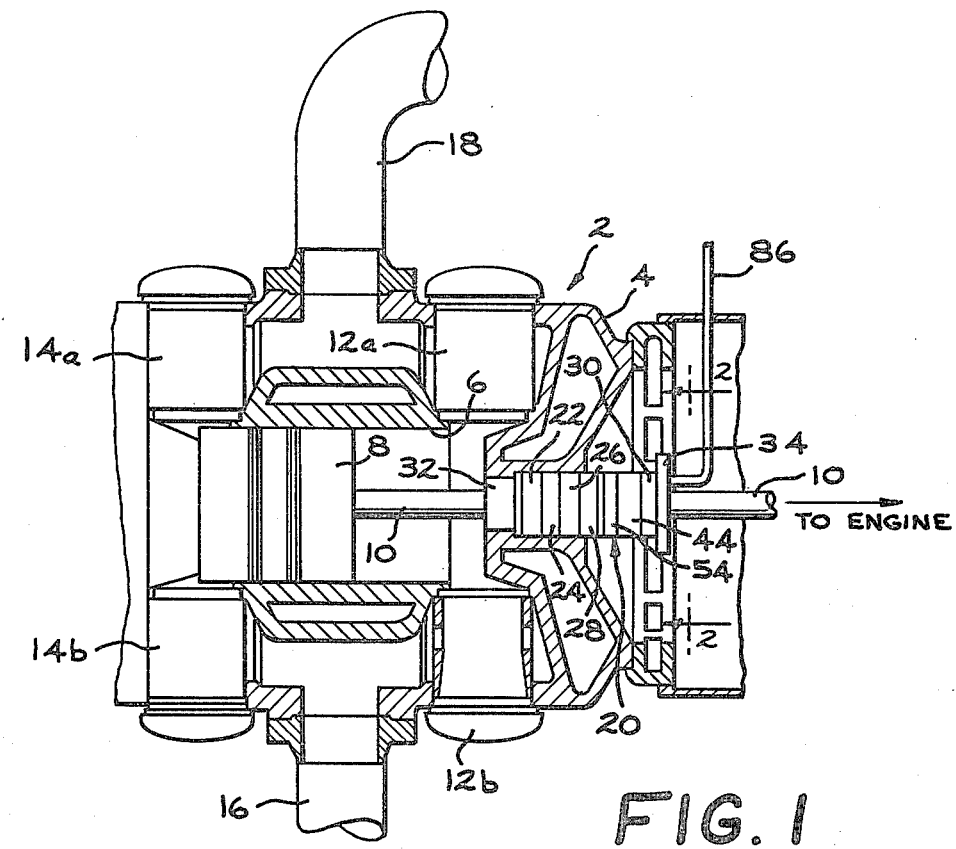
FIG. 1 shows a cross-sectional side elevation view of a portion of a conventional compressor containing a series of conventional rod packing rings and the assembly static leak seal of the present invention, thus illustrating one preferred embodiment thereof.

Referring now to FIG. 1, there is shown a portion of a conventional industrial compressor 2 such as the type commonly used in natural gas transmission line pumping stations. Typically, the compressor 2 includes a frame 4 which defines a piston cylinder bore 6 in which is disposed a piston 8 adapted for reciprocal movement therein. A piston rod 10 is connected to the piston 8 and extends through the frame 4 (to the right as viewed in FIG. 1) to connection with a suitable prime mover, not shown, such as a diesel engine or the like, whereby the piston 8 can be driven back and forth within the bore 6 to compress gas, all in a conventional and well known manner. A series of conventional suction and discharge valves 12a,b and 14a,b communicate with the bore 6 on opposite ends thereof to alternately draw low pressure gas into the bore 6 to be compressed by the piston 8 and to discharge the resulting compressed gas during each cycle of piston operation. A main gas line inlet header 16 introduces low pressure gas into the compressor 2 while a main gas line outlet header 18 discharges compressed gas from the compressor 2 to a main gas transmission line, not shown.

Figure 3:
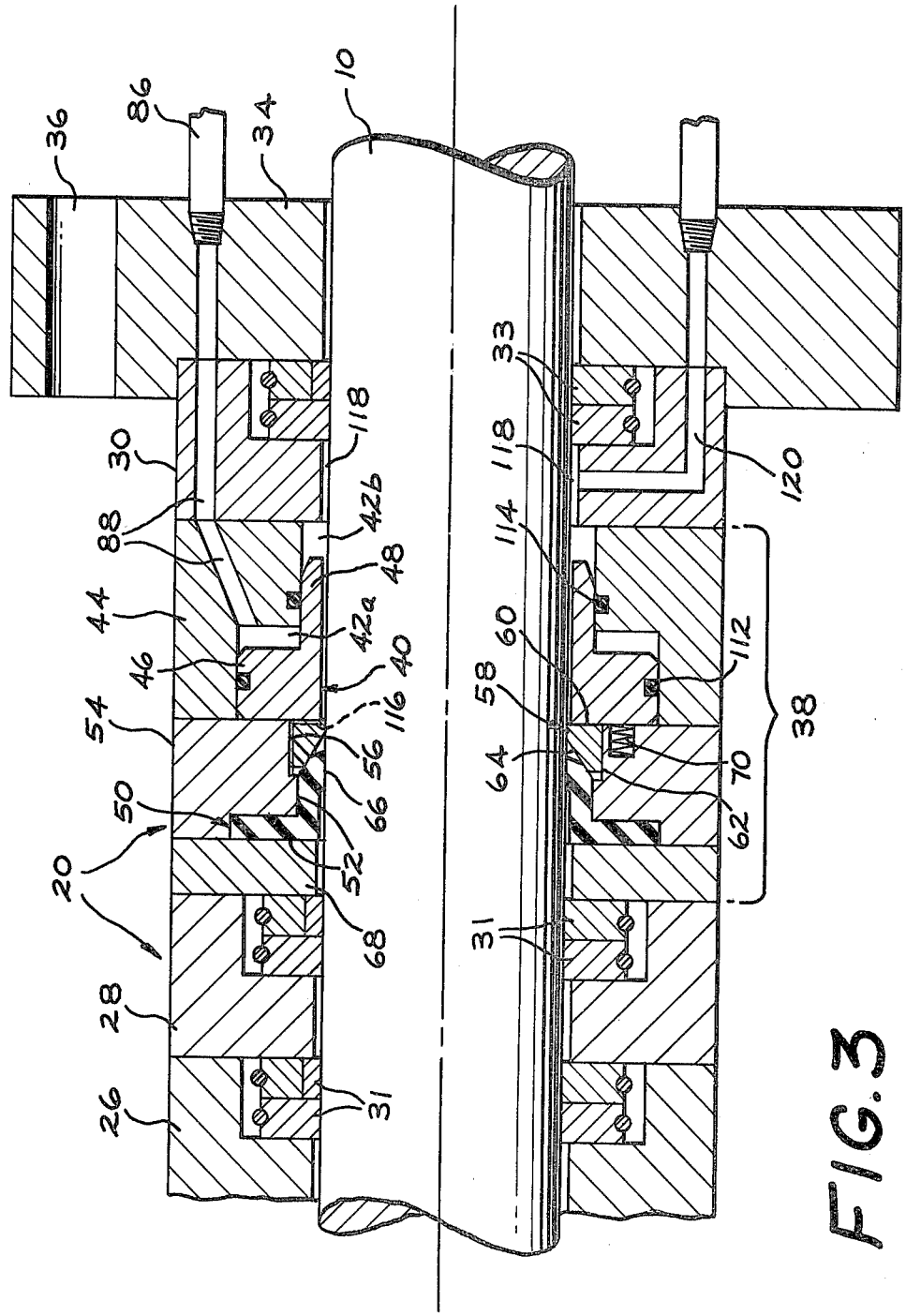
FIG. 3 shows a cross-sectional side elevation view of the assembly of FIGS. 1-2 as viewed along cross-section lines 3—3 of FIG. 2.

Referring now also to FIGS. 2–3, there is shown a piston rod packing ring assembly 20 disposed around the rod 10 which contains a series of conventional cups 22, 24, 26, 28 and 30 housing ordinary packing rings 31 and 33 (FIGS. 1–3 only) for use in sealing the spaces between the rod 10 and the frame 4 to inhibit high pressure gas from leaking through such spaces and out of the frame 4 while the rod 10 is engaged in reciprocating movement. Prior art packing rings 31 and 33 suitable for this purpose include, for example, type BT and BD packing rings, respectively, as manufactured by Dover Corporation/C. Lee Cook Division, 916 South 8th Street, Louisville, Ky. The entire packing ring assembly 20 is tightly confined in a conventional and stationary manner in the frame 4 between a collar 32 (FIG. 1 only) and a packing flange 34 so that the rod 10 will reciprocate therethrough when in motion. The flange 34 is secured to the frame 4 in the usual and well known manner by means of bolts, not shown, which are inserted through flange bolt holes 36.

Referring now to FIGS. 1–5, there is shown, in accordance with the principles of my invention, a static leak seal assembly 38 (see particularly FIG. 3) for inhibiting fluid leakage from the compressor 2 through the spaces between the rod 10 and conventional packing rings 31, 33 when the rod 10 is in a static or motionless condition. The assembly 38 is mounted around the rod 10 and is tightly confined between the conventional packing ring cups 28 and 30, thus forming the remaining portion of the otherwise conventional packing ring assembly 20. The assembly 38 includes a movable piston or piston means 40 disposed within a two-section chamber 42a,b which is formed around the rod 10 in a disc-shaped piston means containment plate 44. The piston 40 of the present example contains a relatively large diameter disc-shaped end portion 46 disposed within the chamber section 42a and a substantially lesser diameter cylindrically-shaped end or neck portion 48 which projects at least partially into the adjacent chamber portion 42b. The chambers 42a,b have sufficiently greater axial dimensions than that of the end portion 46 and neck portion 48, to permit the piston 40 to move along the rod 10 from a retracted position to an extended position therein and vice versa. FIG. 3 shows the piston 40 in an extended position within the chambers 42a,b.

The assembly 38 also includes a fluid pressure sealing means or collar 50 which is constructed of a suitably flexible, resilient material such as, for example, Teflon, rubber or plastic. The collar 50 is mounted around the rod 10 and is confined within a first chamber portion 52 located around the rod 10 as defined by a disc-shaped containment plate 54. A second chamber portion 56 formed around the rod 10 in the plate 54 which communicates with the first chamber portion 52 houses a follower means which, in the present example, comprises an annular ring 58 having a flat base 60 and a circular periphery 62 which form two mutually perpendicular exterior surfaces. The ring 58 also contains an interior surface 64 which extends generally diagonally between margins of the exterior surfaces 60 and 62. The plate 54 is disposed next to the plate 44 and the second chamber portion 56 opens toward and communicates with the chamber section 42a in the plate 44 so that the piston 40 can push the follower ring 58 against the collar 50 as the piston 40 is forced to its extended position. When placed in its extended position, the piston 40 forces the interior surface 64 of the follower ring 58 against an end portion or neck 66 of the flexible collar 50 to force the neck 66 inwardly against the rod 10 to effect a substantially fluid tight seal therearound. The diagonally-extending interior surface 64 of the ring 58 thus continuously increases its inward pressure against the neck 66 as the piston 40 drives the ring 58 from a retracted position toward an extended position within the second chamber portion 56. Note that the axial dimension of the second chamber 56 is somewhat greater than the axial dimension of ring surface 62 to permit the ring 58 to be moved by the piston 40 from a retracted to an extended position within the plate 54 to effect the desired seal. The diameter of the second chamber 56 of the plate 54 should also be sufficient to allow the ring 58 to adjust itself in radial displacement around the rod 10 as the ring 58 is driven against the collar neck 66 to assure a uniformly tight seal around the entire periphery of the rod 10. For this reason, it is necessary that the follower ring 58 be structurally separate and distinct from the piston 40 rather than physically connected to it.

The chamber portion 52 opens on a broad surface of the plate 54 facing the conventional cup 28 so that the plate 54 can be fitted over the collar 50 during placement of the assembly 38 on the rod 10. A disc-shaped backing plate 68 is thereafter disposed around the rod 10 between the plate 54 and the cup 28 to insure confinement of the collar 50 in chamber portion 52. The plates 44, 54 and 68 thus form a housing for the piston 40, ring 58 and collar 50. The assembly 38 also includes biasing means for maintaining the piston 40 in its retracted position in the chambers 42a,b to relieve the pressure of the follower ring 58 from the collar neck 66 when the rod 10 is in motion. In the present example, such biasing means includes a series of springs 70 disposed in blind holes located in and around the plate 54 radially beyond the periphery of the rod 10 and second chamber portion 56 (See FIGS. 2–3). The blind holes containing the springs 70 open on a broad surface of the plate 54 against the piston 40. When the compressor 2 is deactivated so that the rod 10 becomes motionless, a suitable piston driving means is activated to drive the piston 40 from its retracted to its extended position to overcome the bias of the springs 70 which are then compressed into the blind holes in the plate 54 as shown in FIG. 3. One example of such a piston driving means is a fluid circuit 72 as shown in FIG. 6.

Figure 6:
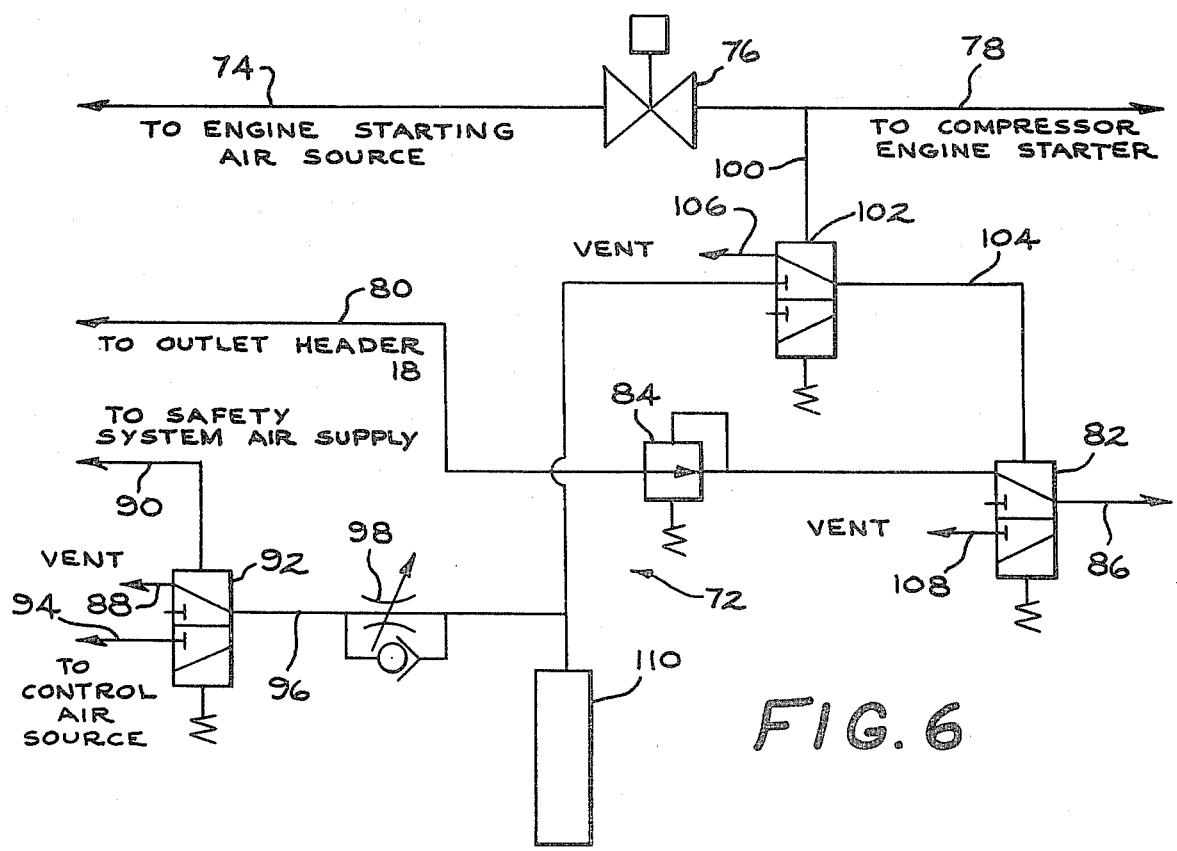
FIG. 6 shows a schematic diagram of a fluid circuit for activating and disengaging the assembly of FIGS. 1-3.

Referring now to all of the figures and in particular to FIG. 6, there is shown an air line 74 connected between a suitable source of compressor engine starting air and one side of a conventional shut-off valve 76. An air line 78 is connected between the other side of the valve 76 and a conventional compressor engine starter in the usual, well known manner to permit starting of the compressor engine by opening the valve 76. An air line 80 is connected between a tap on the compressor outlet header 18 and a conventional 2-position control valve 82. A suitable pressure regulator 84 is shown in the line 80. The valve 82 is set to pass high pressure air from the outlet header 18 and the line 80 into a line 86 and thence through an air passage 88 formed in the flange 34, cup 30 and plate 44 into the chamber section 42a only when the compressor 2 is inoperative and when the rod 10 is at rest. Thus, when the rod 10 is at rest, the condition of the valve 82 is as shown in FIG. 6 and the piston 40 is held in its extended position in the chamber 42a as shown in FIG. 3.

When the compressor 2 is in operation and the rod 10 is in motion, an air line 90 connected between a suitable safety system air sypply and a switching port of a conventional 2-position valve 92 is pressurized to close the valve 92 to disconnect an air line 94 from an air line 96. The line 94 is connected to a suitable control air source. A conventional flow meter 98 is located in the line 96. Since the compressor 2 is in operation, the shutoff valve 76 is closed to depressurize the line 78. An air line 100 connected between the line 78 and a switching port of a conventional 2-position control valve 102 is, therefore, also depressurized, whereby the valve 102 is open to vent a line 104 connected between the valve 102 and a switching port of the valve 82 to atmosphere through a vent line 106. When the line 104 is thus depressurized, the condition of the valve 82 is such that the line 86 is vented to atmosphere through a vent line 108, whereby the piston chamber section 42a is depressurized to allow the springs 70 to maintain the piston 40 in its retracted position opposite its position as shown in FIG. 3.

When the compressor 2 is inoperative and the rod 10 is at rest, the safety system air supply is turned off whereby the line 90 is depressurized and the valve 92 is open so that control air in the line 94 passes into the line 96 through the flow meter 98 and is presented to the valve 102. Since the compressor 2 is inoperative at this time, engine start air is off and the lines 78 and 100 are depressurized so that the valve 102 passes control air from the line 96 to the line 104 to open the valve 82 to pass outlet header air from the line 80 to line 86 and thence to the chamber 42a.

Upon start-up of the compressor engine, the line 90 is still depressurized because the engine is not yet running, whereby the valve 92 is open to pass control air from the line 94 through the line 96 to the valve 102. However, during startup, the valve 76 is open thus pressurizing lines 78 and 100. Under these conditions, valve 102 is closed to vent the line 104 through the line 106 so that the valve 82 is closed to vent the chamber section 42a along the vent line 108. Thus the piston 40 is returned to its retracted position in the chamber 42a to break the fluid tight seal of the collar neck 66 from around the rod 10 before the rod 10 is set in motion. To complete the description of the circuit 72, a conventional accumulator 110 is connected to the line 96 to smooth out air pressure surges which might otherwise occur therein.

Returning now to FIG. 3, a pair of conventional O-ring seals 112 and 114 are placed in grooves around the periphery of the end portion 46 of the piston 40 and in defining wall of the chamber section 42b, respectively, to prevent leakage of high pressure fluid between the piston 40 and the walls of the chamber sections 42a,b so that sufficiently high pressures can be maintained in the chamber section 42a to hold the piston 40 in its extended position during long periods of inactivity of the compressor 2. A vent channel 116 is formed in and across the base 60 of the follower ring 58 (See FIGS. 3-5) to vent air from a forward end portion of the chamber section 42a as the piston 40 is forced from its retracted position toward its extended position, which air might otherwise prohibit such movement. The air vented through the channel 116 escapes along a fluid leakage path existing between the piston 40 and the rod 10 into the chamber section 42b and thence along a vent path 118 existing between a portion of the seal 30 and the rod 10 through a vent passage 120.

The static leak seal assembly of the present invention may be used advantageously in any machine of the type containing a movable shaft or rod adapted to operate in a pressurized fluid environment. Not only does this include a machine such as the compressor 2 containing the reciprocating piston rod 10 of the present example, but also machines such as motors containing rotating rods or shafts which are adapted to operate in a pressurized fluid. As implied previously herein, the piston 40 should relatively loosely fit around the rod 10 to allow the latter to move relatively friction-free therethrough when the compressor 2 is in operation. Such a loose fit also provides a fluid leakage path between the piston 40 and the rod 10 for the venting of fluid from the forward end of the chamber 42a through the vent paths 116, 118 and vent passage 120 to assure that the piston 40 can be moved to its extended position when desired. As an alternative to the fluid circuit 72 of FIG. 6, it is contemplated that the piston driving means of the present invention includes various arrangements of mechanical and electromechanical devices such as, for example, an electrical solenoid valve arrangement.

Although the subject invention has been described with respect to specific details of a certain preferred embodiment thereof, it is not intended that such details limit the scope and coverage of this document other than as set forth in the following claims.

I claim:

1. A static leak seal assembly for use in a machine of the type which conventionally includes a cylinder, a fluid under pressure in said cylinder, a rod movable in said fluid, packing means for maintaining a fluid tight seal about said rod when said rod is in motion, and a packing flange, said assembly comprising piston means separate and distinct from said flange adapted for movement relative to said rod from a retracted to an extended position when the movement of said rod has been stopped and from said extended to said retracted position preparatory to setting said rod in motion;

follower means separate and distinct from said piston means adapted for slidable movement relative to said rod in an axial direction between retracted and extended positions in response to corresponding movements of said piston means, said follower means being at least slightly movable in all radial directions about said rod;

fluid sealing means constructed of a flexible, resilient material and adapted for mounting around said rod next to said follower means, said sealing means being compressible inwardly against said rod to form a substantially fluid tight seal therearound, said follower means being adapted to compress said sealing means to form said seal when placed in its extended position;

biasing means for maintaining said piston means in its retracted position when said rod is in motion;

means for driving said piston means to its extended position in opposition to said biasing means when said rod becomes motionless; and means for deactivating said driving means to permit said biasing means to return said piston means to its retracted position to relieve the compressive force of said follower means from said sealing means to break said seal preparatory to setting said rod in motion.

2. The assembly of claim 1 wherein said follower means comprises an annular ring having a flat base and a circular periphery forming two mutually perpendicular exterior surfaces, and an interior surface extending diagonally between said exterior surfaces, said interior surface being disposed in opposing relation to said sealing means for continuously increasing the compression of said sealing means against said rod as said ring is moved toward its extended position and for allowing adjustment of the radial disposition of said ring about said rod to effect a uniform seal around the periphery of said rod.

3. The assembly of claim 1 wherein said sealing means is constructed of materials selected from the group consisting of Teflon, rubber and plastic.

4. The assembly of claim 1 further comprising housing means adapted for disposition around said rod and for stationary attachment to a frame of said machine for housing said piston, follower, sealing and biasing means therein.

5. The assembly of claim 1 wherein said driving means comprises a fluid circuit.

6. The assembly of claim 2 wherein said ring contains a fluid vent channel formed in and across said base to vent a residual fluid from in front of said piston means which might otherwise prohibit said piston means from reaching its extended position on command.

7. The assembly of claim 4 wherein said housing means comprises a piston means containment plate adapted for mounting around said rod and defining chamber means about said rod for movable disposition of said piston means therein between its retracted and extended positions; and a sealing and follower means containment plate for mounting on said rod next to said piston means containment plate defining a first chamber about said rod for fixedly confining said sealing means therein and a second chamber about said rod communicating with said first chamber for confining said follower means therein, said second chamnber being adapted to permit said follower means to slide axially along said rod between its retracted and extended positions while permitting said follower ring to adjust in radial disposition about said rod to effect said seal against said rod uniformly about the periphery of said rod.

8. The assembly of claim 7 wherein said housing means further comprises a backing plate disposed on said rod axially adjacent said sealing and follower means containment plate for maintaining said sealing means in said sealing means containment plate.

9. The assembly of claim 7 wherein said biasing means comprises a series of springs located annularly around said rod and follower means in said sealing and follower means containment plate, said springs acting on said piston means.

10. The assembly of claim 7 wherein said driving means comprises a fluid circuit having a flow passage disposed in said housing means and communicating with said chamber means for introducing a fluid into said chamber means upon command.

11. The assembly of claim 10 further comprising means for venting said housing means of residual fluid to permit operation of said piston and follower means for movement to their extended positions.

12. The assembly of claim 1 wherein said fluid sealing means and biasing means are separate and distinct from one another.

* * * * *